United States Patent
Novlan

(10) Patent No.: US 12,262,306 B2
(45) Date of Patent: Mar. 25, 2025

(54) MULTIPLEXING CAPABILITY INDICATION FOR INTEGRATED ACCESS AND BACKHAUL

(71) Applicant: AT&T Intellectual Property I, L.P., Atlanta, GA (US)

(72) Inventor: Thomas Novlan, Jonestown, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 179 days.

(21) Appl. No.: 17/480,564

(22) Filed: Sep. 21, 2021

(65) Prior Publication Data

US 2023/0086079 A1    Mar. 23, 2023

(51) Int. Cl.
*H04W 48/16* (2009.01)

(52) U.S. Cl.
CPC .................. *H04W 48/16* (2013.01)

(58) Field of Classification Search
CPC ............................... H04W 48/16; H04W 8/24
USPC .......................................................... 370/254
See application file for complete search history.

(56) References Cited

U.S. PATENT DOCUMENTS

| | | | |
|---|---|---|---|
| 11,405,847 B2 * | 8/2022 | Abedini | H04L 5/006 |
| 11,483,701 B2 * | 10/2022 | Abedini | H04B 17/336 |
| 11,540,211 B2 * | 12/2022 | Hampel | H04W 48/16 |
| 2021/0143959 A1 * | 5/2021 | Xu | H04W 8/005 |
| 2021/0289438 A1 * | 9/2021 | Kim | H04W 24/02 |
| 2021/0410058 A1 * | 12/2021 | Dey | H04W 40/24 |
| 2023/0180096 A1 * | 6/2023 | Wei | H04W 40/22 |
| | | | 370/329 |
| 2023/0361857 A1 * | 11/2023 | Makki | H04B 7/15557 |

FOREIGN PATENT DOCUMENTS

| | | | | |
|---|---|---|---|---|
| WO | WO-2020029868 A1 * | 2/2020 | ......... | H04B 7/0626 |
| WO | WO-2020032481 A1 * | 2/2020 | | |

* cited by examiner

*Primary Examiner* — Yazan A Soofi
*Assistant Examiner* — Ahmed Alkirsh
(74) *Attorney, Agent, or Firm* — Guntin & Gust, PLC; Douglas Schnabel

(57) ABSTRACT

The technology is generally directed towards sending multiplexing capability data between integrated access and backhaul (IAB) nodes, such as for use in coordinating the communications of the nodes, including using multiplexed resources. In addition to different types of multiplexing capabilities, the technology facilitates sending condition data (e.g., measured interference, traffic, beam data and the like) by which a parent node can make determinations with respect to coordinating (e.g., scheduling and/or guard symbol usage) child node communications. Further, the technology provides for sending usage criterion data with the multiplexing capability indication data, such that, for example, any specified usage criterion needs to be satisfied before a particular type of multiplexing can be used.

20 Claims, 11 Drawing Sheets

| Slot index | t | t+1 | t+2 |
|---|---|---|---|
| Multiplexing Capability | Type 1 | Type 2 and Type 3 | Type 4 |

| Slot index | t | t+1 | t+2 |
|---|---|---|---|
| Multiplexing Capability | Bitmap =1 | Bitmap =2 and 3 | Bitmap=4 |

MULTIPLEXING CAPABILITY INDICATION FOR INTEGRATED ACCESS AND BACKHAUL

TECHNICAL FIELD

The subject application is related to wireless communication systems, and, for example, to multiplexing integrated access and backhaul links, and related embodiments.

BACKGROUND

Due to the larger bandwidth available for New Radio (NR, e.g., in the mmWave spectrum) compared to LTE along with the native deployment of massive MIMO (Multiple-Input Multiple-Output) or multi-beam systems in NR, integrated access and backhaul (IAB) links can be developed and deployed. This may, for example, allow easier deployment of a dense network of self-backhauled NR cells in a more integrated manner by building upon many of the control and data channels/procedures defined for providing access to user equipment (UE). In general, IAB nodes (e.g., nodes B and C) multiplex access (mobile terminal/e.g., user equipment) and backhaul (distributed unit/e.g., access point) links in time, frequency, and/or space (e.g., beam-based operation), to relay user traffic to a donor or parent IAB node (e.g., a node A), and vice-versa.

The design of multi-hop IAB networks is based on a hierarchical concept that allows use of existing access downlink and uplink procedures and channels to create a multi-hop network. This is done by having a user equipment (UE) function (alternatively referred to as a mobile termination (MT) function) and a gNodeB (gNB) or distributed unit (DU) function (DU) at each relay. The UE function is used for communicating with the parent node(s), whereas the IAB-DU function is used for communicating with the child nodes or a UE.

At mmWave frequencies, blockage events may result in sudden sharp drops in signal strength (of the order of 30 dB) due to physical objects blocking the link Depending on environmental factors and user mobility, frequent beam failure events due to blockage can occur, potentially resulting in frequent beam switches. As a result, multi-connectivity is a desirable feature for IAB to support robustness and fast route selection in case of blockage events.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
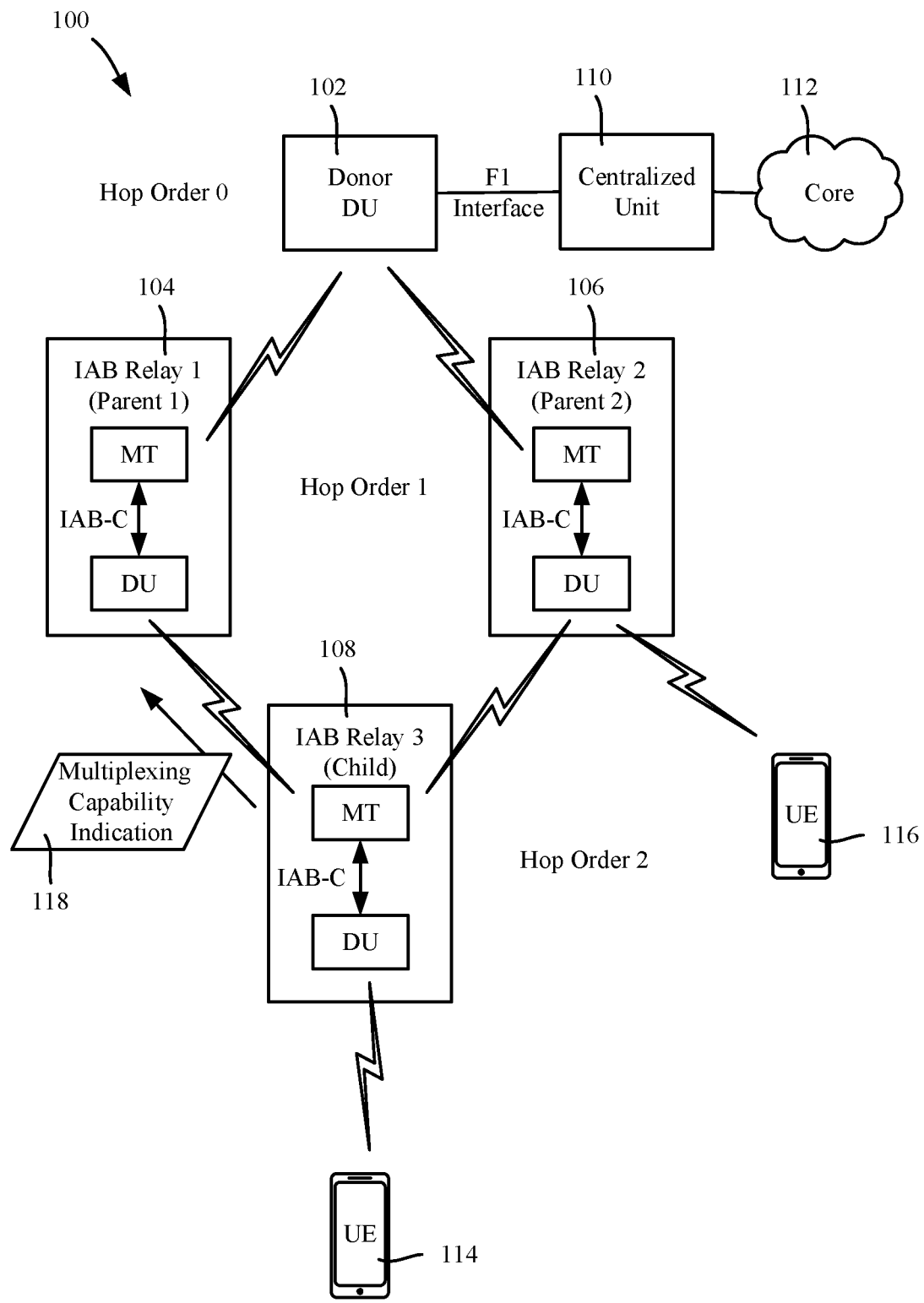
FIG. 1 illustrates an example wireless communication system in which integrated access and backhaul (IAB) nodes are hierarchically arranged, including with a child IAB node having multiple parent IAB nodes, and in which one parent node receives a multiplexing capability indication from a child node, in accordance with various aspects and embodiments of the subject disclosure.

Various aspects of the technology described herein are directed towards techniques for indicating multiplexing capability, e.g. over-the-air dynamically or on demand, for integrated access and backhaul (IAB) networks. The multiplexing capability for a given IAB node is based on considering multi-parent operation and different resource allocation partitions as described herein, in general to avoid conflicting configurations and reduce (e.g., minimize) interference and/or latency. For example, depending on traffic load variations or radio measurements including reference signal received power (RSRP) and/or cross-link interference (CLI) measurements, via the technology described herein the available downlink and/or uplink resources shared between access and backhaul links at a given IAB node may be dynamically optimized.

It should be noted that terms used herein, such as "optimize," "optimization," "optimal" and the like only represent objectives to move towards a more optimal state, rather than necessarily obtaining ideal results. For example, "optimizing" a network/system/cell means moving towards a more optimal state, rather than necessarily achieving an optimal result. Similarly, "maximize", such as to "maximize throughput" means moving towards a maximal state, not necessarily achieving such a state, while "minimize" such as to minimize interference and/or latency means moving towards a minimal state, not necessarily achieving such a state. Further, the terms "dynamic" or "dynamically" as used herein can mean on-demand and/or as needed, and do not necessarily refer to continuous, regular or constant activity or the like.

It also should be understood that any of the examples and terms used herein are non-limiting. For instance, the examples are based on New Radio (NR, sometimes referred to as 5G) communications between a user equipment exemplified as a smartphone or the like and network device; however virtually any communications devices (user and network) including 6G and beyond may benefit from the technology described herein. Thus, any of the embodiments, aspects, concepts, structures, functionalities or examples described herein are non-limiting, and the technology may be used in various ways that provide benefits and advantages in radio communications in general.

In some embodiments the non-limiting term "radio network node" or simply "network node," "radio network device or simply "network device" is used herein. These terms may be used interchangeably, and refer to any type of network node that serves user equipment and/or connected to other network node or network element or any radio node from where user equipment receives signal. Examples of radio network nodes are Node B, base station (BS), multi-standard radio (MSR) node such as MSR BS, gNodeB, eNode B, network controller, radio network controller (RNC), base station controller (BSC), relay, donor node controlling relay, base transceiver station (BTS), access point (AP), transmission points, transmission nodes, RRU, RRH, nodes in distributed antenna system (DAS) etc.

In some embodiments the non-limiting term user equipment (UE) is used. It refers to any type of wireless device that communicates with a radio network node in a cellular or mobile communication system. Examples of user equipment are target device, device to device (D2D) user equipment, machine type user equipment or user equipment capable of machine to machine (M2M) communication, PDA, Tablet, mobile terminals, smart phone, laptop embedded equipped (LEE), laptop mounted equipment (LME), USB dongles etc.

Some embodiments are described in particular for 5G new radio systems. The embodiments are however applicable to any radio access technology (RAT) or multi-RAT system where the user equipment operates using multiple carriers e.g. LTE FDD/TDD, WCMDA/HSPA, GSM/GERAN, Wi Fi, WLAN, WiMax, CDMA2000 etc.

The embodiments are applicable to single carrier as well as to multicarrier (MC) or carrier aggregation (CA) operation of the user equipment. The term carrier aggregation (CA) is also called (e.g. interchangeably called) "multi-carrier system", "multi-cell operation", "multi-carrier operation", "multi-carrier" transmission and/or reception. Note that the solutions outlined applies for Multi RAB (radio bearers) on some carriers (that is data plus speech is simultaneously scheduled).

FIG. 1 illustrates an example wireless communication system 100 comprising a multiple hop (multi-hop) integrated access and backhaul network in accordance with various aspects and embodiments of the subject technology. As shown in FIG. 1, the design of a multi-hop IAB network according to the 3rd Generation Partnership Project (3GPP) standards is based on a hierarchical concept that allows use of existing access downlink (DL) and uplink (UL) procedures and channels to create a multi-hop network. This is arranged by having a donor node 102 (at hop order 0), comprising a distributed unit, operate as a hierarchical parent to IAB relay nodes 104 and 106 (at hop order 1), which are parents of a child relay node 108 (at hop order 2) and so on. The donor node 102 is coupled via an F1 interface to a centralized unit (CU) 110 and the core 112. Note that FIG. 1 is only one example hierarchical IAB configuration, and, for example there can be a greater number or lesser number of hop orders and different numbers of parent and/or child nodes.

To act as an IAB link, each relay node is configured with a mobile UE function (alternatively referred to as an MT (mobile termination) function) and a gNB (gNodeB) or distributed unit (DU) function (IAB-DU). The MT function is used for communicating with the parent node(s), whereas the IAB-DU function is used for communicating with the child nodes and/or a UE 114 (or 116). The IAB-MT function and the IAB-DU function internally coordinate/communicate using a control plane interface (IAB-C).

As shown in the example of FIG. 1 via block 118, the technology described herein facilitates the communication of a multiplexing capability indication between nodes, from the child relay node 108 to the parent relay node 104 in this example. As described herein, the multiplexing capability indication 118 can be used to semi-statically set configuration data/coordination data for parent and child communications, and/or for dynamic reconfiguration of such data. Note that the multiplexing capability of a node can change over time, e.g., due to network-related conditions such as blockage, interference and so forth.

In various embodiments, the system 100 can be configured to provide and employ 5G wireless networking features and functionalities. With 5G networks that may use waveforms that split the bandwidth into several sub bands, different types of services can be accommodated in different sub bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications; MIMO can be used for achieving diversity gain, spatial multiplexing gain and beamforming gain.

Note that using multi-antennas does not always mean that MIMO is being used. For example, a configuration can have two downlink antennas, and these two antennas can be used in various ways. In addition to using the antennas in a 2×2 MIMO scheme, the two antennas can also be used in a diversity configuration rather than MIMO configuration. Even with multiple antennas, a particular scheme might only use one of the antennas (e.g., LTE specification's transmission mode 1, which uses a single transmission antenna and a single receive antenna). Or, only one antenna can be used, with various different multiplexing, precoding methods etc.

The MIMO technique uses a commonly known notation (M×N) to represent MIMO configuration in terms number of transmit (M) and receive antennas (N) on one end of the transmission system. The common MIMO configurations used for various technologies are: (2×1), (1×2), (2×2), (4×2), (8×2) and (2×4), (4×4), (8×4). The configurations represented by (2×1) and (1×2) are special cases of MIMO known as transmit diversity (or spatial diversity) and receive diversity. In addition to transmit diversity (or spatial diversity) and receive diversity, other techniques such as spatial multiplexing (comprising both open-loop and closed-loop), beamforming, and codebook-based precoding can also be used to address issues such as efficiency, interference, and range.

A child IAB node may have a primary backhaul link to a parent, as well as one or more secondary backhaul links to different parent nodes. The parents may be of the same hop order (e.g. one hop order value below the child node's hop order value) or may be from different hop orders. For example if the IAB network utilizes a directed acyclic graph (DAG) topology, the only restriction on the parent nodes is that they cannot have the same hop order value or a higher hop order value as the child node (to avoid mesh connectivity or loops in the routes between the end points). Furthermore the parent nodes may be connected to or associated with the same donor (wired) node central unit (CU) via wired or wireless backhaul connectivity. In this case, coordination between parent nodes involves communication over an intra-donor interface. Alternatively, the parent nodes may be connected to or associated with a different donor (wired) node central unit (CU) via wired or wireless backhaul connectivity. In this case, coordination between parent nodes involves communication over an inter-donor interface (e.g. the Xn interface).

There can be different time/frequency partitions between the access and backhaul links. Further, when considering extending the frame structure design to support multi-hop topologies, when the donor gNB (hop order 0) sends downlink (DL) transmissions to the relay node of hop order 1, the relay node is receiving, hence it can schedule its access UEs (whose gNB/DU the relay node is) in the uplink (UL). Alternatively, a second order relay node can transmit to a first order relay node when the first order relay node is receiving from the donor node 302 (hop order 0). Via a coordinated frame structure, a node can be receiving a downlink transmission from another node while receiving an uplink transmission from a UE, for example.

The frame structure can be semi-statically coordinated across the IAB nodes via centralized or distributed coordination mechanisms. As a result, the multiplexing capability for a given IAB nodes considers multi-parent operation and different resource allocation partitions in order to avoid conflicting configurations and minimize interference/latency. To this end, the communication of multiplexing capability indication(s) between nodes of an IAB network is described herein.

In centralized coordination, one node determines the DL/UL frame structure for the relay nodes in the hops orders. For example the DL/UL frame structure can be semi-statically configured based on the hop order using RRC (radio resource control) signaling from the parent/donor IAB node to IAB node UE function, which internally coordinates using a control plane interface (IAB-C) to inform the IAB DU function of the desired frame structure pattern. In another alternative, the DL/UL frame structure may be provided to the DU function via F1/OAM (operation and management) messages over higher layer control plane signaling, which can be routed over one or more backhaul hops from a central unit (CU) or RAN (radio access network) controller. In yet another alternative, the frame structure is provided by an anchor carrier (e.g. LTE or sub 6 GHz NR carrier) in case of non-standalone (NSA) operation for IAB nodes.

In distributed coordination, each node only determines the DL/UL frame structure for the relay nodes that are connecting to that node. With the relay nodes of each hop order determining the DL/UL frame structure for relays connecting to it, the DL/UL frame structure is determined for the whole topology. The coordination message signaling can be based on higher layer signaling, including system information broadcast, RRC from the parent node, or signaled via another carrier (e.g. via LTE or NR anchor carrier).

However, for both centralized and distributed coordination, depending on traffic load data (e.g., traffic load variations) and/or radio measurements including RSRP (reference signal received power) or CLI (cross link interference) measurements, the available DL/UL resources shared between access and backhaul links at a given IAB node may be (e.g., dynamically) optimized/made more optimal, as described herein. To this end, exchanging multiplexing capability information between the nodes facilitates the minimizing of interference/latency.

Parent and child IAB nodes can exchange information about the supported multiplexing capabilities of the IAB node, including:

Type 1: Time Division Multiplexing (TDM) only
Type 2: Non-TDM receive (Rx) only (e.g. space division multiplexing, or SDM Rx)
Type 3: Non-TDM transmit (Tx) only (e.g. SDM Tx)
Type 4: Non-TDM Rx and Tx (e.g. Full Duplex).

These multiplexing capabilities can be used for multiple purposes, including the configuration of IAB-specific guard symbols, (one or more symbols at the beginning and/or the end of slots where the child IAB-node switches operation from its IAB-DU to its IAB-MT function or vice versa). Guard symbols can be used to enable more efficient utilization of resources, including guard symbols and soft resources at the child IAB-DU. In addition, the multiplexing capabilities may be used for scheduling and resource allocation decisions, including in the spatial domain (e.g. beam management).

The multiplexing capability indications can be used for dynamic messaging (e.g., change the pattern whenever the child node detects a change in conditions), or a semi-static pattern scenario can be provided. A hybrid scenario is available, in which a semi-static pattern is modified by a dynamic control message to make a relevant multiplexing change within that semi-static pattern.

Multiple factors may influence whether a given multiplexing case is more or less appropriate for a given time/frequency resource, e.g., to avoid certain DL or UL slots used by access UEs or TDM-only IAB nodes, and also other factors such as self-interference or cross-link interference, single or multi-parent operation, transmit or receive antenna panel selection, and device capabilities. As a result, in order for the dynamic indication of availability of soft resources to be utilized effectively, the node(s) are able to take this potential variability of the multiplexing operation into account.

Extending the multiplexing capability indication is based on an IAB node providing information about the supported multiplexing capabilities to the donor node and/or parent nodes via F1-AP or OAM (operation, administration, and maintenance) signaling. The capability indication may be provided separately for each capability type, or may be provided jointly indicating a set or subset of supported capabilities.

Figure 2:
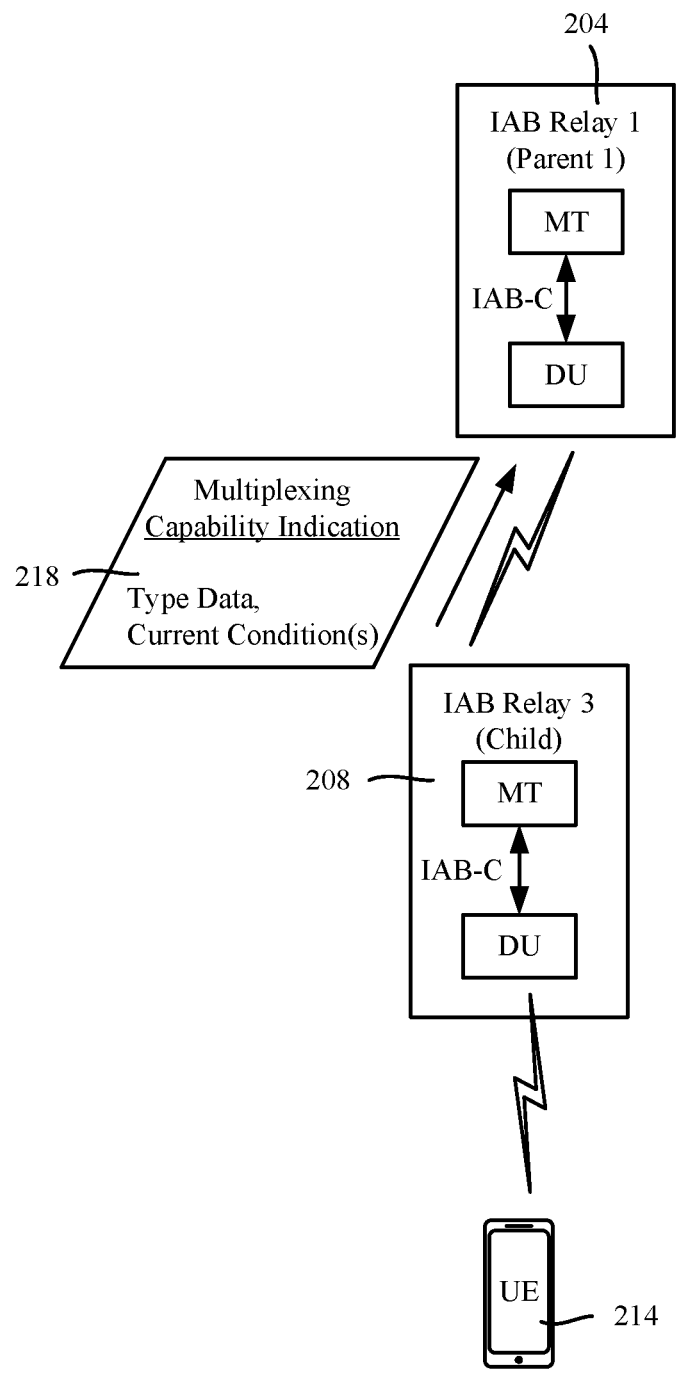
FIG. 2 illustrates a child IAB node sending a multiplexing capability indication to a parent node, in which the multiplexing capability indication includes current condition data, in accordance with various aspects and embodiments of the subject disclosure.

In one alternative, the multiplexing capability indication may be provided with the IAB resource configuration, and a specific capability may correspond to a contiguous or non-contiguous set or subset of time/frequency resources. As depicted in FIG. 2, a multiplexing capability indication 218 can, for example, include the above type data and current condition data (one or more current conditions such as interference measurements, beams in use, traffic load, and the like) that the parent node 204 can use in determining multiplexing of the sending child node 208. Based on this, the parent node 204 can dynamically determine and coordinate multiplexing (e.g., schedule, determine guard symbol usage, and so on) of the child node relative to a current context. This is in contrast to a static capability signaling through a centralized entity.

By way of example, consider an IAB node that is utilizing two different cells, with, for example partially overlapped frequencies. The IAB node can indicate Type1, Type2, Type3 and/or Type 4 multiplexing, e.g., via an uplink control message or a MAC CE, that for a certain subset of the resources, only a particular resource multiplexing type applies. For example, in an overlapped portion of the frequencies between the two cells, one type of multiplexing (e.g., Type 1 (TDM)) can be used, while in the non-overlapped region, another type (possibly all types) of multiplexing can be used. The message thus indicates the multiplexing capability data along with the frequencies to which the multiplexing capability types apply.

Figures 3A, 3B, 3C:
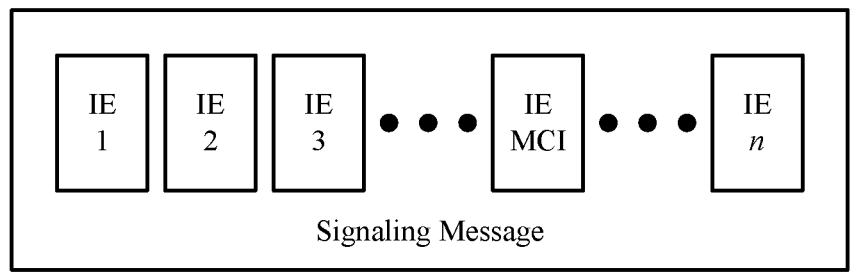
FIGS. 3A-3C are example representations of signaling multiplexing capability indication from a child IAB node to a parent IAB node, in accordance with various aspects and embodiments of the subject disclosure.

In another alternative, multiple multiplexing capability indications may be provided with the IAB resource configuration, corresponding to contiguous or non-contiguous sets or subsets of time/frequency resources. For example, as represented in FIG. 3A, in slot t, a first multiplexing capability may be indicated (Type 1), and in slot t+1 a second and third multiplexing capability may be indicated (Type 2 and Type 3), and a third slot all four multiplexing capabilities may be indicated (Type 1, Type 2, Type 3, and Type 4). The indication of the capabilities may correspond to a pattern configured by a bitmap (FIG. 3B), or may be provided by a separate information element (IE) in a signaling message (FIG. 3C).

In yet another alterative, the capability indication may be provided on a per-link basis, e.g. corresponding to a set of parent cell ID(s), component carriers or carrier groups, beams (e.g. based on synchronization signal block (SSB) or CSI-RS indices), groups of beams, or antenna panels.

Figure 4:
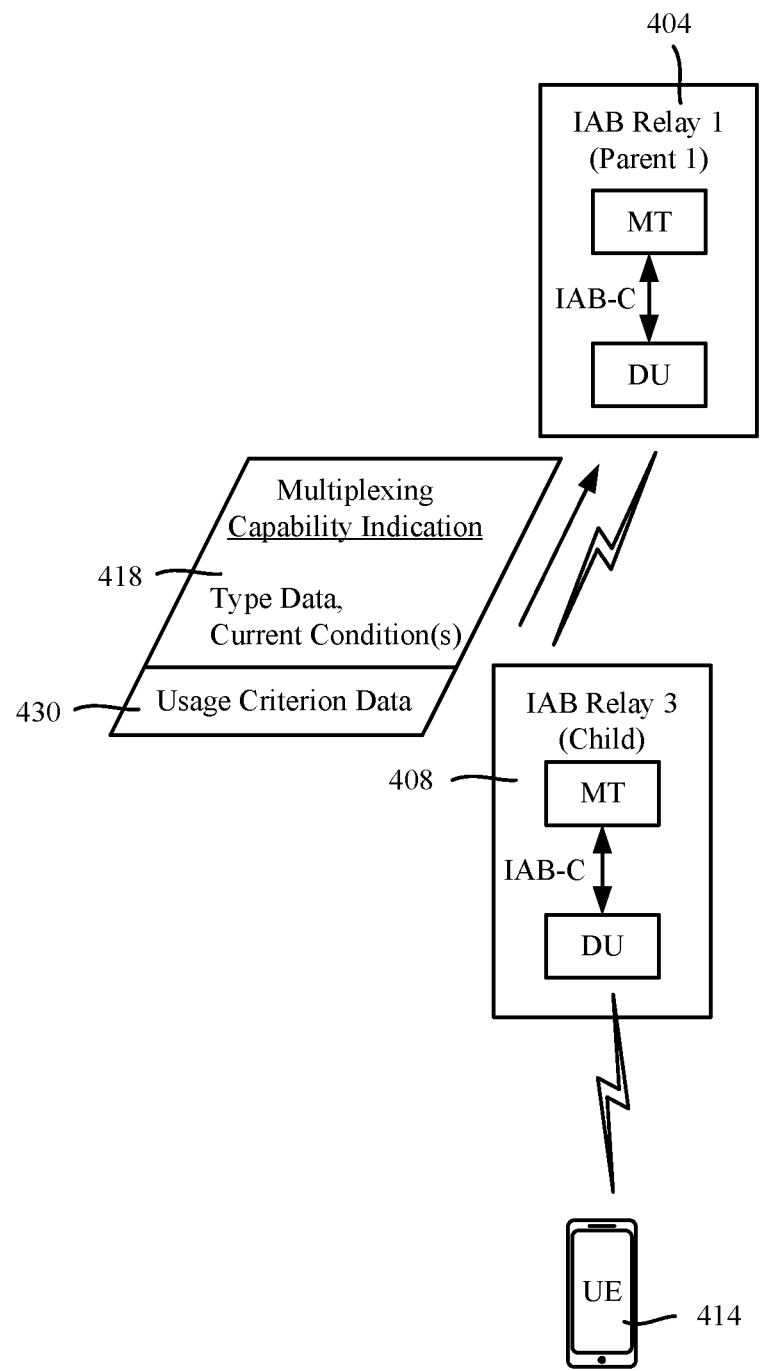
FIG. 4 illustrates a child IAB node sending a multiplexing capability indication to a parent node, in which the multiplexing capability indication includes (optional) current condition data and usage criterion data, in accordance with various aspects and embodiments of the subject disclosure.

In addition to an indication of the multiplexing capability of a child IAB node, criterion data, comprising a set of one or more conditions or restrictions that need to be met for the usage of a given multiplexing capability, may be indicated to the donor and/or parent nodes. An example is shown in FIG. 4, in which usage criterion data 430 is appended to (or alternatively can be part of) the multiplexing capability indication message 418 send from the child node 408 to the parent node 404. Various non-limiting example alternatives are described herein.

For example, in one alternative, the criterion data indicating a contingent condition or restriction for using a multiplexing capability can be based on a supported timing alignment mode between a parent and child node; e.g., if not supported, then this multiplexing capability cannot be used. In a second alternative, the criterion data indicating a condition or restriction for using a multiplexing capability is based on a supported desired signal and/or interference measurement threshold being met. In a third alternative, the criterion data/condition or restriction for using a multiplexing capability is based on a configuration of a set of guard symbols or frequency resources between IAB-MT and/or IAB-DU transmission or reception opportunities.

In a fourth alternative, the condition or restriction for using a multiplexing capability can be recommended or restricted on a per-link basis, e.g. corresponding to a set of parent cell ID(s), component carriers or carrier groups, beams (e.g. based on SSB or CSI-RS (channel state information reference signal) indices), groups of beams, or antenna panels. In a fifth alternative, the condition or restriction for using a multiplexing capability is based on the IAB resource configuration, corresponding to contiguous or non-contiguous sets or subsets of time/frequency resources. In a sixth alternative, the condition or restriction for using a multiplexing capability is based on radio frequency (RF) hardware limitations (data), including but not limited to DL or UL transmit power, available power headroom, a power imbalance metric, dynamic range requirements, and/or adjacent channel leakage requirements. In a seventh alternative, the condition or restriction for using a multiplexing capability is based on link or channel type, including cell-specific configurations (e.g. STC/SMTC (SSB transmission configuration/SSB-based measurement timing configuration), RACH (random access channel(s)),), system information, periodic CSI-RS etc.) of the IAB-MT or IAB-DU, or whether a given link or channel includes resources that are not used for access UE transmissions and are reserved for backhaul transmission and reception. Other alternatives and/or combinations of the above seven example alternatives are feasible.

Instead of semi-static coordination, the parent and child nodes may utilize dynamic signaling to indicate the supported multiplexing capability or capabilities and/or conditions or restrictions for utilizing the indicated capability or capabilities. In one example, the parent IAB nodes may exchange over-the-air messages (e.g. downlink control information (DCI) or medium access control (MAC) control element (MAC CE)), which indicate the capabilities and conditions, or the child node may indicate to one or multiple parents the capabilities and conditions in an uplink control message (e.g. uplink control information (UCI) or MAC CE). In another example, the dynamic indication of multiplexing capability and guard symbols for a subset of time/frequency resources of given backhaul link can be sent via DCI (e.g., an enhancement to DCI Format 2_5) that indicates whether one or more capabilities (e.g. Type 1 or Type 2+Type3) correspond to a given soft resource availability indication. In a second example, the capability indication can be jointly provided with MAC-based signaling of guard symbols between an IAB node and its parent node. The guard symbols may be provided per capability or for a subset of capabilities, (e.g. Type 1 or Type 2+Type3).

In one alternative, the dynamic capability indication may be provided between parent nodes and the child node on a slot-by-slot basis or for duration of slots. In another alternative, a semi-persistent indication can be provided jointly or independently from the dynamic capability indication in one or more DCI messages/formats. In another alternative the semi-persistent indication can be provided via a MAC CE. In yet another alternative, the semi-persistent indication can be configured by higher-layer signaling (e.g. RRC, F1, or OAM messages). The semi-persistent indication may be given with a time-domain pattern or window for validity (e.g. valid for the next 40 milliseconds) and/or may be indicated with a given applicability criteria (e.g. in a certain beam pair is selected for either Tx/Rx or CSI/CLI measurements are above/below a given threshold) and/or may be activated/deactivated by control signaling (e.g. DCI or MAC CE).

In another alternative, the dynamic capability indication may be provided between parent nodes and the child node using a request and response signaling flow. In a first request, a parent node may request an updated multiplexing capability indication which may include one or more supported capability or capabilities and may include one or more conditions or restrictions corresponding to the indicated capability or capabilities. In a response, the child node may provide the multiplexing capability indication which may include one or more supported capability or capabilities and may include one or more conditions or restrictions corresponding to the indicated capability or capabilities. The request/response may be based on dynamic signaling (e.g. DCI/UCI or MAC CE) or higher layer signaling (e.g. BAP (Backhaul Adaptation Protocol, a 5G layer 2 Routing protocol for IAB), RRC, or F1-AP (F1 interface application protocol).

Note that while aspects of the description have somewhat considered the usage and indication of time domain resources, this technology can additionally be applied to frequency domain resources wherein the parent and child links may operate over two or more overlapping or non-overlapping frequency bands, component carriers, resource blocks, groups of resource blocks, or bandwidth parts. In addition the technology can additionally be applied to spatial domain resources for different parent and child links (e.g. cell or UE specific beamforming, component carriers, or beams/panels).

Figure 5:
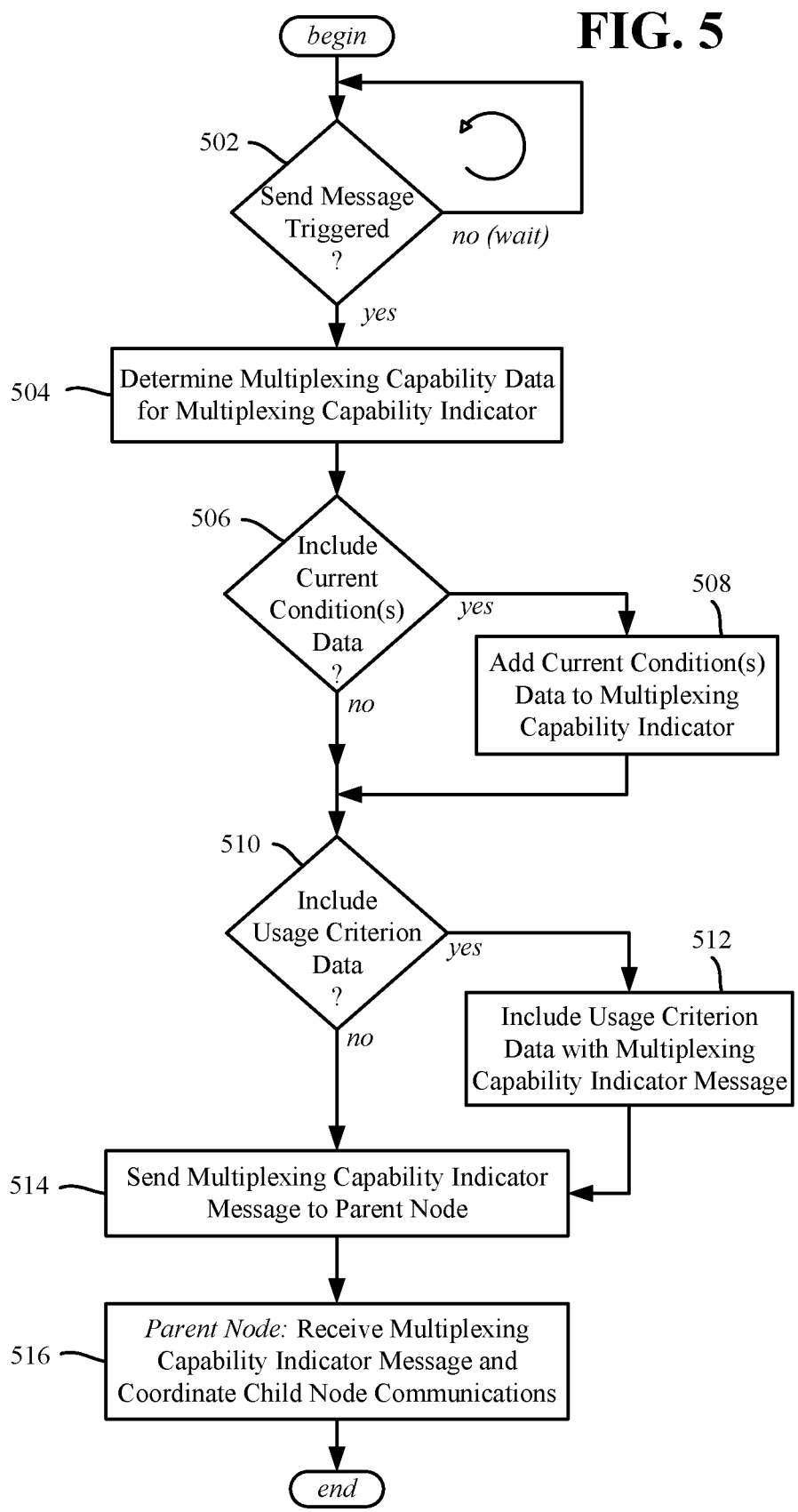
FIG. 5 is an example representation showing example operations of a child IAB node with respect to sending a multiplexing capability indication including any related data, in accordance with various aspects and embodiments of the subject disclosure.

FIG. 5 summarizes example operations of a child node with respect to sending a multiplexing capability indication to a parent node. Operation 502 represents waiting until some criterion or criteria is met that triggers sending a multiplexing capability indication, e.g., a change in conditions that exceeds a threshold, a periodic or occasional refresh, or the like.

When a message needs to be sent, operation 504 represents the child node determining its multiplexing capability data for the multiplexing capability indicator/indication as described herein, including the multiplexing Type information. If current condition data needs to be included with the Type information, operations 506 and 508 add this as part of the message (although sending a separate, associated message is feasible).

As described herein, usage criterion data can be optionally sent, e.g., as part of the multiplexing capability indication message or appended thereto in a separate, associated message. Operations 510 and 512 represent handling the inclusion of any optional usage criterion data.

Operation 514 represents sending the multiplexing capability indicator/indication to the parent node. As represented at operation 516, the parent node uses the information to coordinate communications of the child node, e.g., schedule resources based on the multiplexing capability indication and any other accompanying information, that is, condition data and/or usage criterion data.

Figure 6:
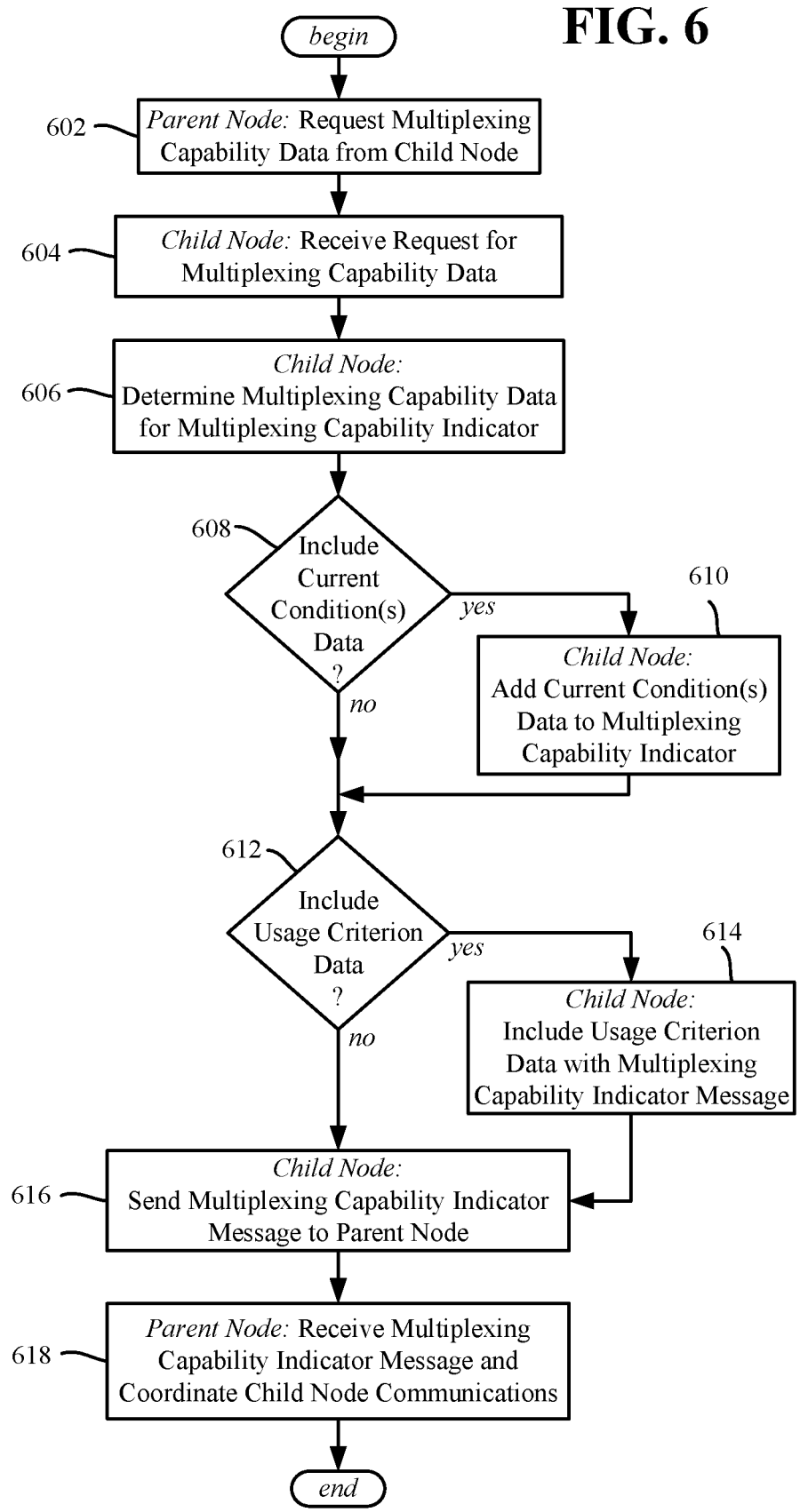
FIG. 6 is an example representation showing example operations related to a parent IAB node requesting a multiplexing capability indication, including any related data from a child IAB node, in accordance with various aspects and embodiments of the subject disclosure.

FIG. 6 summarizes example operations of a parent and child node with respect to requesting a multiplexing capability indication and responding thereto. Operation 602 represents the parent node requesting a multiplexing capability indication from the child node, which the child node receives at operation 604.

Operation 606 represents the child node determining its multiplexing capability data for the multiplexing capability indicator/indication as described herein, including the multiplexing Type information. If current condition data needs to be included with the Type information, operations 608 and 610 add this as part of the message (although sending a separate, associated message is feasible).

As described herein, usage criterion data can be optionally sent, e.g., as part of the multiplexing capability indication message or appended thereto in a separate, associated message. Operations 612 and 614 represent handling the inclusion of any optional usage criterion data.

Operation 616 represents sending the multiplexing capability indicator/indication to the parent node. As represented at operation 618, the parent node uses the information to coordinate communications of the child node, e.g., schedule resources based on the multiplexing capability indication and any other accompanying information, that is, condition data and/or usage criterion data.

Figure 7:
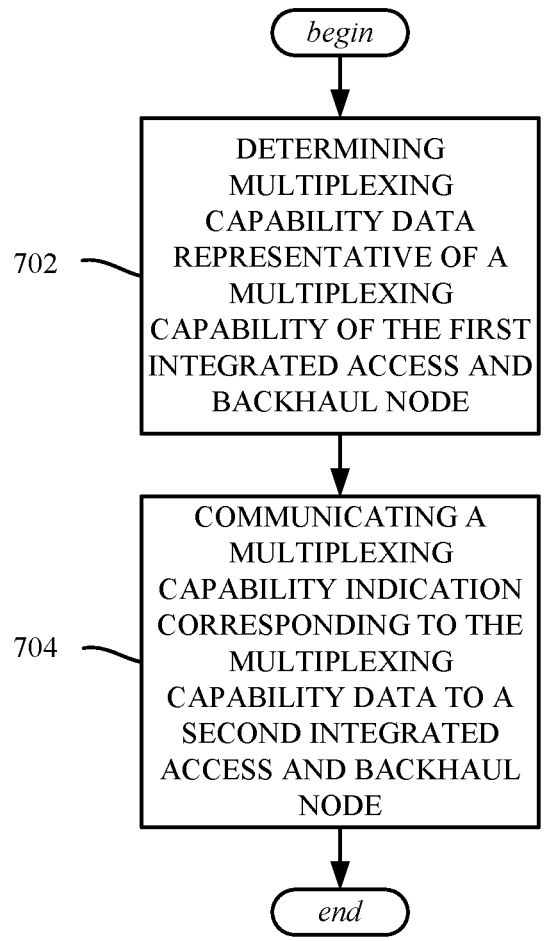
FIG. 7 is a flow diagram showing example operations related to communicating a multiplexing capability indication between IAB nodes, in accordance with various aspects and embodiments of the subject disclosure.

One or more aspects are represented in FIG. 7, and can comprise example operations, such as of a first integrated access and backhaul node, comprising a processor, and a memory that stores executable instructions which, when executed by the processor of the first integrated access and backhaul node, facilitate performance of operations. Operation 702 represents determining multiplexing capability data representative of a multiplexing capability of the first integrated access and backhaul node. Operation 704 represents communicating a multiplexing capability indication corresponding to the multiplexing capability data to a second integrated access and backhaul node.

Determining of the multiplexing capability data can include evaluating at least one of: traffic load data representative of a traffic load of the first integrated access and backhaul node, or a radio measurement obtained at the first integrated access and backhaul node.

Communicating of the multiplexing capability indication can occur in response to reception of a request from the second integrated access and backhaul node.

Communicating of the multiplexing capability indication can include communicating capability type data corresponding to at least one of: a first type for time division multiplexing only, a second type for non-time division multiplexing receive only, a third type for non-time division multiplexing transmit only, or a fourth type for non-time division multiplexing receive and non-time division multiplexing transmit. Communicating of the multiplexing capability indication can include respectively communicating the capability indication for separate, respective capability type data, or communicating the capability indication jointly to indicate a group or subgroup of supported capabilities.

The capability indication can be communicated with integrated access and backhaul resource configuration data usable for configuration of integrated access and backhaul resources.

The capability indication can correspond to a contiguous group, contiguous subgroup, non-contiguous group or non-contiguous subgroup of at least one of: time resources or frequency resources.

The capability indication can include a link; the link can correspond to at least one of: a parent cell identifier, a group of parent cell identifiers, a component carrier, component carriers, carrier groups, a beam, beams, groups of beams, an antenna panel or antenna panels.

Further operations can include communicating criterion data indicating contingent usage of the multiplexing capability indication. The criterion data can include at least one of: a supported timing alignment mode between the first and the second node, a signal measurement threshold, or an interference measurement threshold. The criterion data can include at least one of: a configuration of a group of guard symbols, a configuration of frequency resources between transmission or reception opportunities, a per-link basis, beam-related data related to a beam, an integrated access and backhaul resource configuration, a hardware limitation, a link type, or a channel type.

The first integrated access and backhaul node can be a child node, and the second integrated access and backhaul node can be a parent node to the child node.

The second integrated access and backhaul node can be a donor node.

The multiplexing capability data can modify a semi-static multiplexing configuration.

Figure 8:
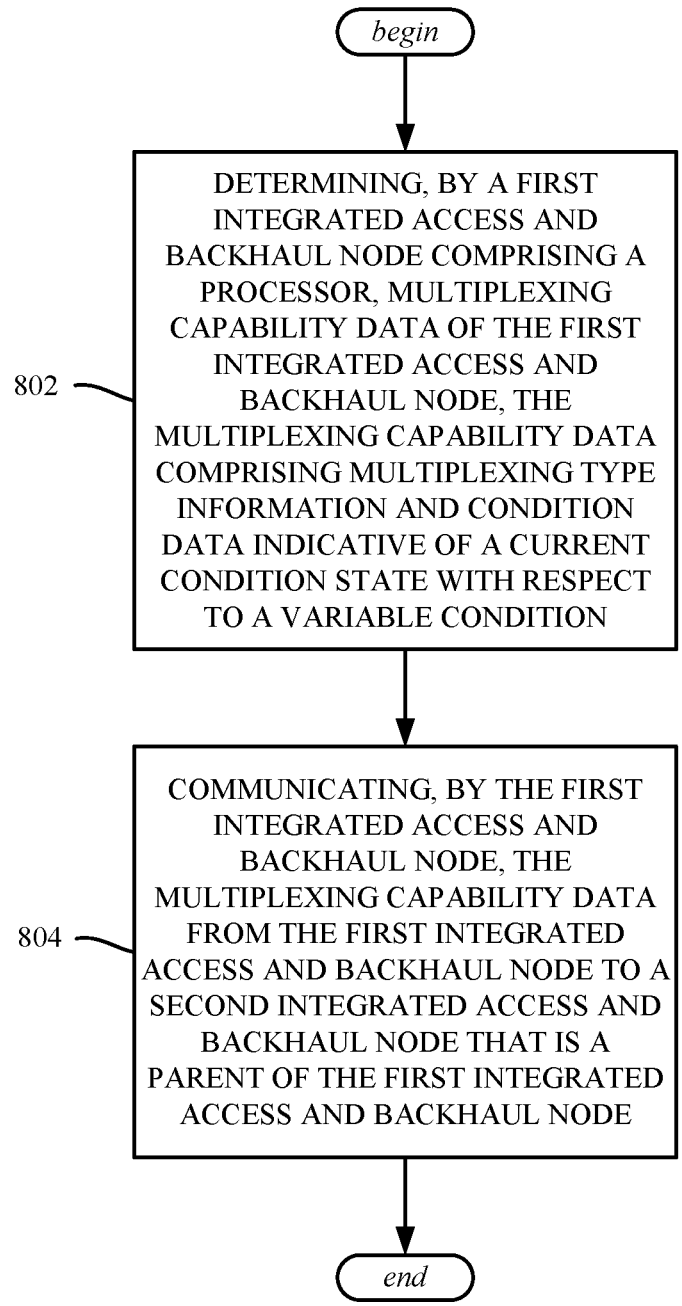
FIG. 8 is a flow diagram showing example operations related to communicating a multiplexing capability indication and condition state data from a child IAB node to a parent IAB node, in accordance with various aspects and embodiments of the subject disclosure.

One or more aspects are represented in FIG. 8, and can comprise example operations, such as of a method, or a processor and a memory that stores executable instructions that, when executed by the processor, facilitate performance of the example operations, or a machine-readable medium, comprising executable instructions that, when executed by a processor, facilitate performance of the example operations. Operation 802 represents determining, by a first integrated access and backhaul node comprising a processor, multiplexing capability data of the first integrated access and backhaul node, the multiplexing capability data comprising multiplexing type information and condition data indicative of a current condition state with respect to a variable condition. Operation 804 represents communicating, by the first integrated access and backhaul node, the multiplexing capability data from the first integrated access and backhaul node to a second integrated access and backhaul node that is a parent of the first integrated access and backhaul node.

Operations can include communicating, by the first integrated access and backhaul node, criterion data indicating contingent usage of the multiplexing capability indication.

Determining the multiplexing capability data can include evaluating at least one of: time resources, frequency resources or spatial resources.

The multiplexing capability data can be first multiplexing capability data comprising first multiplexing type information and first condition data indicative of the current condition state with respect to a variable condition; operations can include detecting, by the first integrated access and backhaul node, a change to the current condition state to a changed condition state, determining, by the first integrated access and backhaul node, second multiplexing capability data of the first integrated access and backhaul node, the second multiplexing capability data comprising second multiplexing type information and second condition data indicative of the changed condition state with respect to the variable condition, and communicating, by the first integrated access and backhaul node, the second multiplexing capability data from the first integrated access and backhaul node to the second integrated access and backhaul node.

Figure 9:
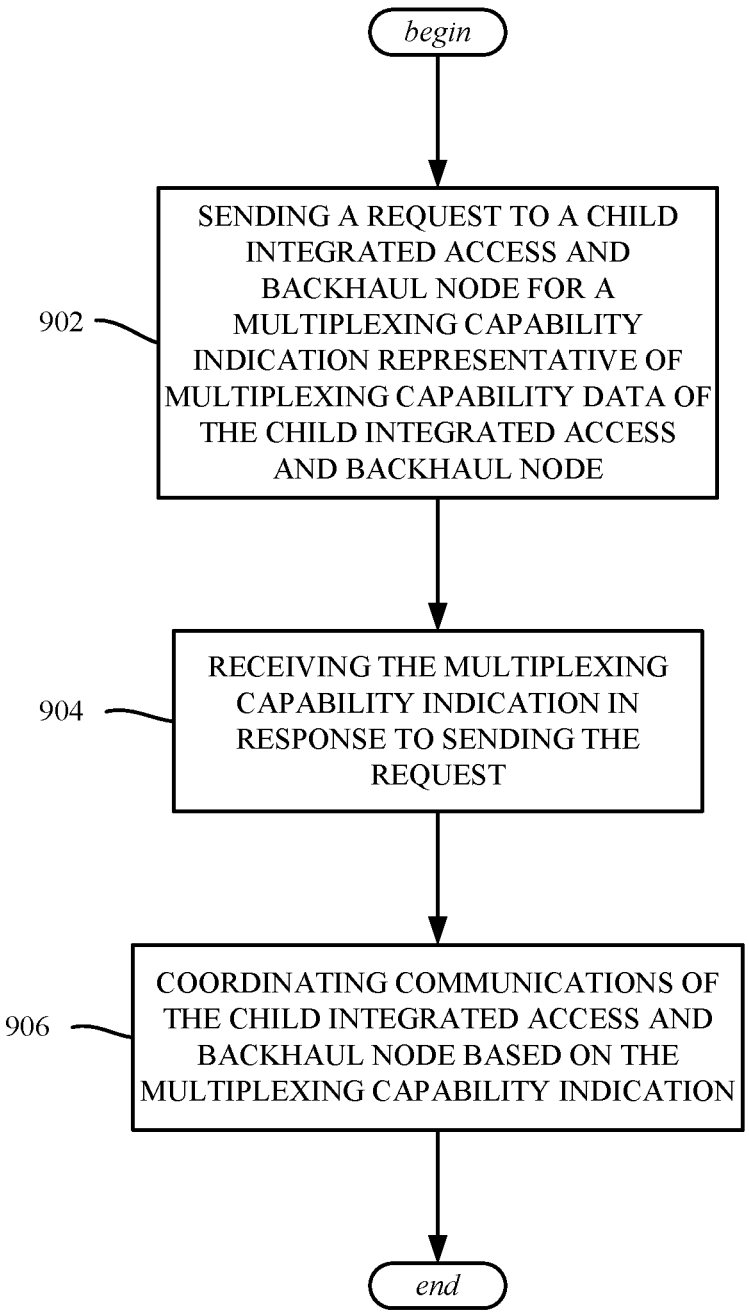
FIG. 9 is a flow diagram showing example operations related to a parent IAB node requesting multiplexing capability indication from a child IAB node, in accordance with various aspects and embodiments of the subject disclosure.

One or more aspects are represented in FIG. 9, and can comprise example operations, such as of a method, a processor and a memory that stores executable instructions that, when executed by the processor of a parent integrated access and backhaul node, facilitate performance of the example operations, or a machine-readable medium, comprising executable instructions that, when executed by a processor of a parent integrated access and backhaul node, facilitate performance of the example operations. Operation 902 represents sending a request to a child integrated access and backhaul node for a multiplexing capability indication representative of multiplexing capability data of the child integrated access and backhaul node. Operation 904 represents receiving the multiplexing capability indication in response to sending the request. Operation 906 represents coordinating communications of the child integrated access and backhaul node based on the multiplexing capability indication.

Further operations can include receiving, from the child integrated access and backhaul node, usage criterion data associated with the multiplexing capability indication, and determining that that usage criterion data is satisfied prior to coordinating the communications of the child integrated access and backhaul node.

As can be seen, the technology supports a dynamic indication of IAB node multiplexing capability of access and backhaul traffic, including to a parent IAB node or across multiple hops of a wireless backhaul network with multiple parent links. The technology facilitates efficient utilization of radio resources by enabling dynamic adaptation of the multiplexing capability for access and backhaul links based on different conditions and restrictions, including physical layer, RF, resource allocation, and interference considerations. The technology also extends multiplexing capability indications beyond time domain resources to also include frequency domain resources or spatial domain resources (e.g. cell, component carriers, or beams/panels). The technology further allows multiplexing capabilities to be coordinated across multiple parent backhaul links using semi-static, semi-persistent, or dynamic indications.

Turning to aspects in general, a wireless communication system can employ various cellular systems, technologies, and modulation schemes to facilitate wireless radio communications between devices (e.g., a UE and the network equipment). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc. For example, the system can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system are particularly described wherein the devices (e.g., the UEs and the network equipment) of the system are configured to communicate wireless signals using one or more multi carrier modulation schemes, wherein data symbols can be transmitted simultaneously over multiple frequency subcarriers (e.g., OFDM, CP-OFDM, DFT-spread OFDM, UFMC, FMBC, etc.). The embodiments are applicable to single carrier as well as to multicarrier (MC) or carrier aggregation (CA) operation of the UE. The term carrier aggregation (CA) is also called (e.g.

interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, the system can be configured to provide and employ 5G wireless networking features and functionalities. With 5G networks that may use waveforms that split the bandwidth into several sub-bands, different types of services can be accommodated in different sub-bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications; MIMO can be used for achieving diversity gain, spatial multiplexing gain and beamforming gain.

Note that using multi-antennas does not always mean that MIMO is being used. For example, a configuration can have two downlink antennas, and these two antennas can be used in various ways. In addition to using the antennas in a 2×2 MIMO scheme, the two antennas can also be used in a diversity configuration rather than MIMO configuration. Even with multiple antennas, a particular scheme might only use one of the antennas (e.g., LTE specification's transmission mode 1, which uses a single transmission antenna and a single receive antenna). Or, only one antenna can be used, with various different multiplexing, precoding methods etc.

The MIMO technique uses a commonly known notation (M×N) to represent MIMO configuration in terms number of transmit (M) and receive antennas (N) on one end of the transmission system. The common MIMO configurations used for various technologies are: (2×1), (1×2), (2×2), (4×2), (8×2) and (2×4), (4×4), (8×4). The configurations represented by (2×1) and (1×2) are special cases of MIMO known as transmit diversity (or spatial diversity) and receive diversity. In addition to transmit diversity (or spatial diversity) and receive diversity, other techniques such as spatial multiplexing (comprising both open-loop and closed-loop), beamforming, and codebook-based precoding can also be used to address issues such as efficiency, interference, and range.

Figure 10:
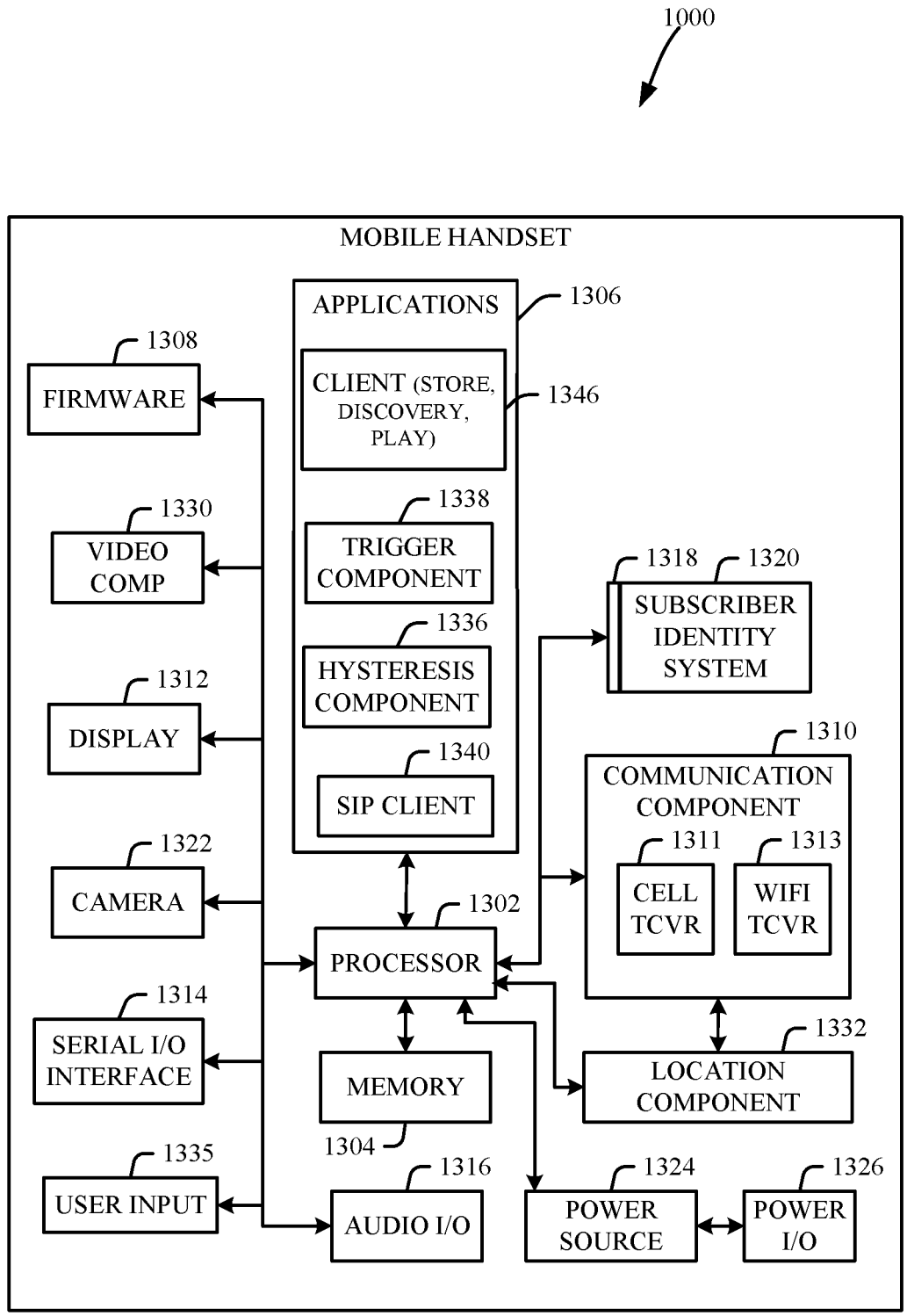
FIG. 10 illustrates an example block diagram of an example user equipment that can be a mobile handset in accordance with various aspects and embodiments of the subject disclosure.

Referring now to FIG. 10, illustrated is a schematic block diagram of an example end-user device such as a user equipment) that can be a mobile device 1000 capable of connecting to a network in accordance with some embodiments described herein. Although a mobile handset 1000 is illustrated herein, it will be understood that other devices can be a mobile device, and that the mobile handset 1000 is merely illustrated to provide context for the embodiments of the various embodiments described herein. The following discussion is intended to provide a brief, general description of an example of a suitable environment 1000 in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can include computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1000 includes a processor 1002 for controlling and processing all onboard operations and functions. A memory 1004 interfaces to the processor 1002 for storage of data and one or more applications 1006 (e.g., a video player software, user feedback component software, etc.). Other applications can include voice recognition of predetermined voice commands that facilitate initiation of the user feedback signals. The applications 1006 can be stored in the memory 1004 and/or in a firmware 1008, and executed by the processor 1002 from either or both the memory 1004 or/and the firmware 1008. The firmware 1008 can also store startup code for execution in initializing the handset 1000. A communications component 1010 interfaces to the processor 1002 to facilitate wired/wireless communication with external systems, e.g., cellular networks, VoIP networks, and so on. Here, the communications component 1010 can also include a suitable cellular transceiver 1011 (e.g., a GSM transceiver) and/or an unlicensed transceiver 1013 (e.g., Wi-Fi, WiMax) for corresponding signal communications. The handset 1000 can be a device such as a cellular telephone, a PDA with mobile communications capabilities, and messaging-centric devices. The communications component 1010 also facilitates communications reception from terrestrial radio networks (e.g., broadcast), digital satellite radio networks, and Internet-based radio services networks.

The handset 1000 includes a display 1012 for displaying text, images, video, telephony functions (e.g., a Caller ID function), setup functions, and for user input. For example, the display 1012 can also be referred to as a "screen" that can accommodate the presentation of multimedia content (e.g., music metadata, messages, wallpaper, graphics, etc.). The display 1012 can also display videos and can facilitate the generation, editing and sharing of video quotes. A serial I/O interface 1014 is provided in communication with the processor 1002 to facilitate wired and/or wireless serial communications (e.g., USB, and/or IEEE 1094) through a hardwire connection, and other serial input devices (e.g., a keyboard, keypad, and mouse). This supports updating and troubleshooting the handset 1000, for example. Audio capabilities are provided with an audio I/O component 1016, which can include a speaker for the output of audio signals related to, for example, indication that the user pressed the proper key or key combination to initiate the user feedback signal. The audio I/O component 1016 also facilitates the input of audio signals through a microphone to record data and/or telephony voice data, and for inputting voice signals for telephone conversations.

The handset 1000 can include a slot interface 1018 for accommodating a SIC (Subscriber Identity Component) in the form factor of a card Subscriber Identity Module (SIM) or universal SIM 1020, and interfacing the SIM card 1020 with the processor 1002. However, it is to be appreciated that the SIM card 1020 can be manufactured into the handset 1000, and updated by downloading data and software.

The handset 1000 can process IP data traffic through the communication component 1010 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 1022 (e.g., a camera) can be provided for decoding encoded multimedia content. The video processing component 1022 can aid in facilitating the generation, editing and sharing of video quotes. The handset 1000 also includes a power source 1024 in the form of batteries and/or an AC power subsystem, which power source 1024 can interface to an external power system or charging equipment (not shown) by a power I/O component 1026.

The handset 1000 can also include a video component 1030 for processing video content received and, for recording and transmitting video content. For example, the video component 1030 can facilitate the generation, editing and sharing of video quotes. A location tracking component 1032 facilitates geographically locating the handset 1000. As described hereinabove, this can occur when the user initiates the feedback signal automatically or manually. A user input component 1034 facilitates the user initiating the quality feedback signal. The user input component 1034 can also facilitate the generation, editing and sharing of video quotes. The user input component 1034 can include such conventional input device technologies such as a keypad, keyboard, mouse, stylus pen, and/or touch screen, for example.

Referring again to the applications 1006, a hysteresis component 1036 facilitates the analysis and processing of hysteresis data, which is utilized to determine when to associate with the access point. A software trigger component 1038 can be provided that facilitates triggering of the hysteresis component 1038 when the Wi-Fi transceiver 1013 detects the beacon of the access point. A SIP client 1040 enables the handset 1000 to support SIP protocols and register the subscriber with the SIP registrar server. The applications 1006 can also include a client 1042 that provides at least the capability of discovery, play and store of multimedia content, for example, music.

The handset 1000, as indicated above related to the communications component 810, includes an indoor network radio transceiver 1013 (e.g., Wi-Fi transceiver). This function supports the indoor radio link, such as IEEE 802.11, for the dual-mode GSM handset 1000. The handset 1000 can accommodate at least satellite radio services through a handset that can combine wireless voice and digital radio chipsets into a single handheld device.

Figure 11:
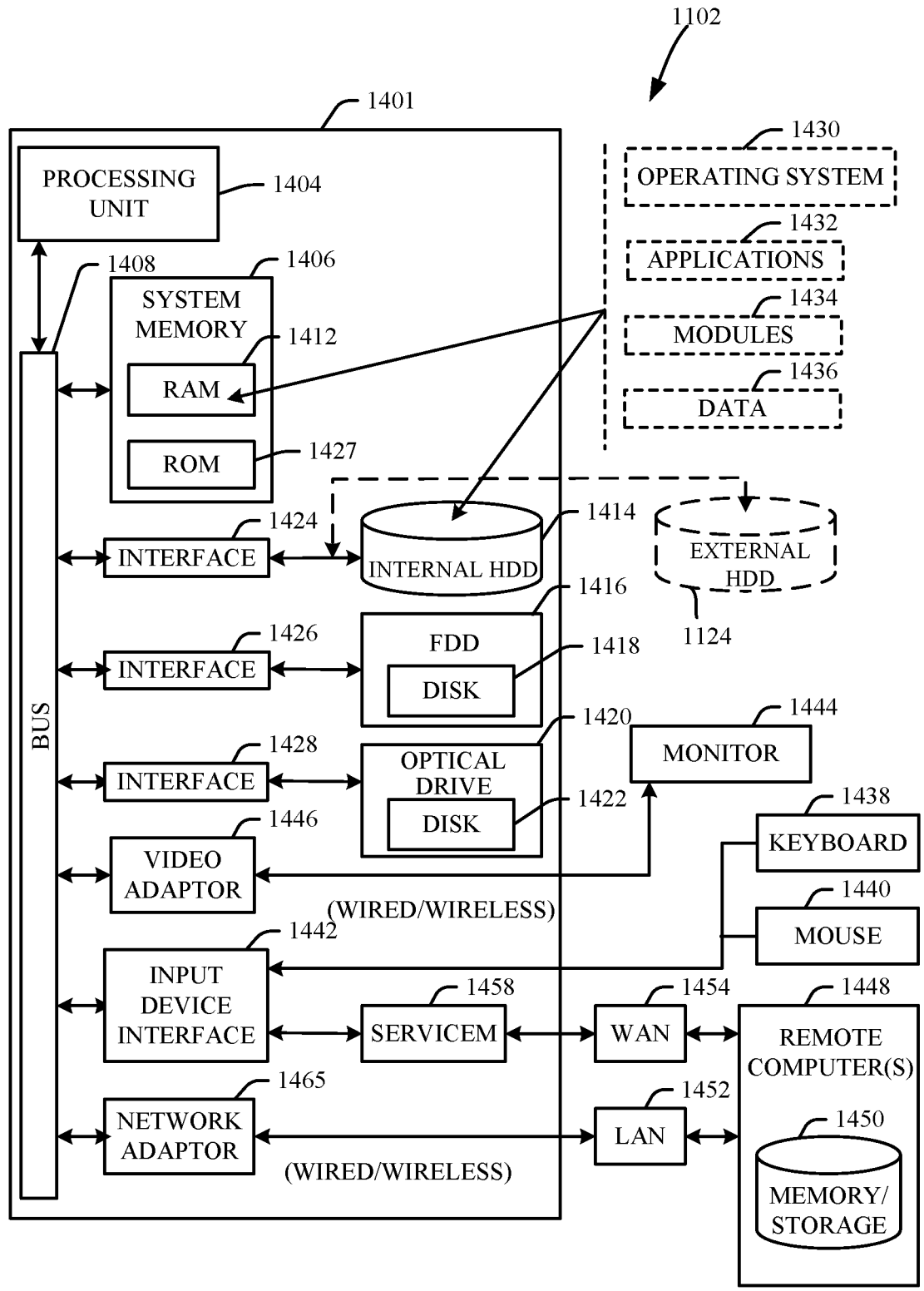
FIG. 11 illustrates an example block diagram of a computer that can be operable to execute processes and methods in accordance with various aspects and embodiments of the subject disclosure.

In order to provide additional context for various embodiments described herein, FIG. 11 and the following discussion are intended to provide a brief, general description of a suitable computing environment 1100 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments of the aspects described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and an optical disk drive 1120 (e.g., which can read or write from a CD-ROM disc, a DVD, a BD, etc.).

While the internal HDD 1114 is illustrated as located within the computer 1102, the internal HDD 1114 can also be configured for external use in a suitable chassis (not shown). Additionally, while not shown in environment 1100, a solid state drive (SSD), non-volatile memory and other storage technology could be used in addition to, or in place of, an HDD 1114, and can be internal or external. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1094 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally include emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can include one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, stand-alone, executable packages of software that include, e.g., code, runtime, system tools, system libraries and settings for an application.

Further, computer 1102 can be enabled with a security module, such as a trusted processing module (TPM). For instance with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1094 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are example and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 8 GHz radio bands, at an 11 Mbps (802.11b) or 84 Mbps (802.11a) data rate, for example, or with products that contain both bands (dual band), so the networks can provide real-world performance similar to the basic "10BaseT" wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory. In addition, memory components or memory elements can be removable or stationary. Moreover, memory can be internal or external to a device or component, or removable or stationary. Memory can include various types of media that are readable by a computer, such as hard-disc drives, zip drives, magnetic cassettes, flash memory cards or other types of memory cards, cartridges, or the like.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to include, without being limited, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments include a system as well as a computer-readable medium having computer-executable instructions for performing the acts and/or events of the various methods.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information.

In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communications media include wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A first integrated access and backhaul node, comprising:
    a processor; and
    a memory that stores executable instructions which, when executed by the processor of the first integrated access and backhaul node, facilitate performance of operations, the operations comprising:
    determining multiplexing capability data representative of a multiplexing capability of the first integrated access and backhaul node;
    communicating a multiplexing capability indication corresponding to the multiplexing capability data to a second integrated access and backhaul node;
    communicating to the second integrated access and backhaul node criterion data indicating semi-persistent usage of the multiplexing capability including a window of validity during which the multiplex capability may be used;
    determining whether the multiplexing capability is available according to the window of validity;
    responsive to the determining that the multiplex capability is available according to the window of validity, receiving, from the second integrated access and backhaul node according to the multiplexing capability data, a first indication of scheduling of multiplexing resources determined by the second integrated access and backhaul node, wherein the first integrated access and backhaul node is a child node of the second integrated access and backhaul node, and wherein the second integrated access and backhaul node has a hop order of at least one;
    determining a current context for the first integrated access and backhaul node according to current condition data;
    communicating the current context and the multiplexing capability indication corresponding to the multiplexing capability data to a third integrated access and backhaul node; and
    receiving, from the third integrated access and backhaul node, a second indication of scheduling of multiplexing resources determined by the third integrated access and backhaul node according to the current context and the multiplexing capability data, wherein the first integrated access and backhaul node is a child node of the third integrated access and backhaul node.

2. The first integrated access and backhaul node of claim 1, wherein the determining of the multiplexing capability data comprises evaluating at least one of: traffic load data representative of a traffic load of the first integrated access and backhaul node, or a radio measurement obtained at the first integrated access and backhaul node.

3. The first integrated access and backhaul node of claim 1, wherein the current condition data includes an interference measurement, a number of beams in use, a traffic load, or any combination thereof.

4. The first integrated access and backhaul node of claim 1, wherein the communicating of the multiplexing capability indication comprises communicating capability type data corresponding to at least one of: a first type for time division multiplexing only, a second type for non-time division multiplexing receive only, a third type for non-time division multiplexing transmit only, or a fourth type for non-time division multiplexing receive and non-time division multiplexing transmit.

5. The first integrated access and backhaul node of claim 4, wherein the communicating of the multiplexing capability indication comprises respectively communicating the multiplexing capability indication for separate, respective capability type data, or communicating the capability indication jointly to indicate a group or subgroup of supported capabilities.

6. The first integrated access and backhaul node of claim 1, wherein the multiplexing capability indication is communicated with integrated access and backhaul resource configuration data usable for configuration of integrated access and backhaul resources.

7. The first integrated access and backhaul node of claim 1, wherein the multiplexing capability indication corresponds to a contiguous group, contiguous subgroup, non-contiguous group or non-contiguous subgroup of at least one of: time resources or frequency resources.

8. The first integrated access and backhaul node of claim 1, wherein the multiplexing capability indication comprises a link, the link corresponding to at least one of:
    a parent cell identifier, a group of parent cell identifiers, a component carrier, component carriers, carrier groups, a beam, beams, groups of beams, an antenna panel or antenna panels.

9. The first integrated access and backhaul node of claim 1, wherein the first indication of scheduling of multiplexing resources determined by the second integrated access and backhaul node and the second indication of scheduling of multiplexing resources determined by the third integrated access and backhaul node are coordinated by the second integrated access and backhaul node and the third integrated access and backhaul node via an intra-donor interface.

10. The first integrated access and backhaul node of claim 9, wherein the criterion data comprises at least one of: a supported timing alignment mode between the first and the second node, a signal measurement threshold, or an interference measurement threshold.

11. The first integrated access and backhaul node of claim 9, wherein the criterion data comprises at least one of: a configuration of a group of guard symbols, a configuration of frequency resources between transmission or reception opportunities, a per-link basis, beam-related data related to a beam, an integrated access and backhaul resource configuration, a hardware limitation, a link type, or a channel type.

12. The first integrated access and backhaul node of claim 1, wherein the second integrated access and backhaul node comprises a parent node to the child node.

13. The first integrated access and backhaul node of claim 1, wherein the second integrated access and backhaul node comprises a donor node.

14. The first integrated access and backhaul node of claim 1, wherein the multiplexing capability data modifies a semi-static multiplexing configuration.

15. A method, comprising:
determining, by a first integrated access and backhaul node comprising a processor, multiplexing capability data of the first integrated access and backhaul node, the multiplexing capability data comprising multiplexing type information and condition data indicative of a current condition state with respect to a variable condition;
communicating, by the first integrated access and backhaul node, the multiplexing capability data, indicating a multiplex capability, from the first integrated access and backhaul node to a second integrated access and backhaul node that is a parent of the first integrated access and backhaul node;
communicating, by the first integrated access and backhaul node, to the second integrated access and backhaul node criterion data indicating semi-persistent usage of including a window of validity during which the multiplex capability may be used;
determining, by the first integrated access and backhaul node, whether the multiplexing capability is available according to the window of validity;
responsive to the determining that the multiplex capability is available according to the window of validity, receiving, by the first integrated access and backhaul node, an indication of scheduling of multiplexing resources determined by the second integrated access and backhaul node, wherein the second integrated access and backhaul node has a hop order of at least one
communicating, by the first integrated access and backhaul node, the current condition state and the multiplexing capability data, indicating a multiplex capability to a third integrated access and backhaul node; and
receiving, by the first integrated access and backhaul node, a second indication from the third integrated access and backhaul node of scheduling of multiplexing resources determined by the third integrated access and backhaul node according to the current condition state and the multiplexing capability data, wherein the first integrated access and backhaul node is a child node of the third integrated access and backhaul node.

16. The method of claim 15, further comprising communicating, by the first integrated access and backhaul node, criterion data indicating contingent usage of the multiplexing capability.

17. The method of claim 15, wherein the determining the multiplexing capability data comprises evaluating at least one of: time resources, frequency resources or spatial resources.

18. The method of claim 15, wherein the multiplexing capability data is first multiplexing capability data comprising first multiplexing type information and first condition data indicative of the current condition state with respect to a variable condition, and further comprising:
detecting, by the first integrated access and backhaul node, a change to the current condition state to a changed condition state,
determining, by the first integrated access and backhaul node, second multiplexing capability data of the first integrated access and backhaul node, the second multiplexing capability data comprising second multiplexing type information and second condition data indicative of the changed condition state with respect to the variable condition, and
communicating, by the first integrated access and backhaul node, the second multiplexing capability data from the first integrated access and backhaul node to the second integrated access and backhaul node.

19. A non-transitory machine-readable medium, comprising executable instructions that, when executed by a processor of a parent integrated access and backhaul node, facilitate performance of operations, the operations comprising:
sending a request to a child integrated access and backhaul node for a multiplexing capability indication representative of multiplexing capability data of the child integrated access and backhaul node;
receiving the multiplexing capability indication in response to sending the request;
receiving criterion data indicating semi-persistent usage of the multiplexing capability including a window of validity during which the multiplex capability may be used;
determining whether the multiplexing capability is available according to the window of validity; and
responsive to the determining that the multiplex capability is available according to the window of validity, coordinating communications of the child integrated access and backhaul node based on the multiplexing capability indication, wherein the parent integrated access and backhaul node has a hop order of at least one, and wherein the coordinating communications of the child integrated access and backhaul node is further according to a second parent integrated access and backhaul node via an intra-donor interface.

20. The non-transitory machine-readable medium of claim 19, wherein the operations further comprise receiving, from the child integrated access and backhaul node, usage criterion data associated with the multiplexing capability indication, and determining that the usage criterion data is satisfied prior to coordinating the communications of the child integrated access and backhaul node.

* * * * *